(12) United States Patent
Gupta et al.

(10) Patent No.: US 7,274,387 B2
(45) Date of Patent: Sep. 25, 2007

(54) AUTOMATIC INTRUSION DETECTION SYSTEM FOR PERIMETER DEFENSE

(75) Inventors: Om P. Gupta, Ithaca, NY (US); Gene M. Norrs, West Leyden, NY (US)

(73) Assignee: Digicomp Research Corporation, Ithaca, NY (US)

( * ) Notice: Subject to any disclaimer, the term of this patent is extended or adjusted under 35 U.S.C. 154(b) by 673 days.

(21) Appl. No.: 10/685,848

(22) Filed: Oct. 15, 2003

(65) Prior Publication Data

US 2004/0208375 A1    Oct. 21, 2004

Related U.S. Application Data

(60) Provisional application No. 60/418,472, filed on Oct. 15, 2002.

(51) Int. Cl.
*H04N 7/18* (2006.01)
*G06K 9/00* (2006.01)

(52) U.S. Cl. .................................... 348/152; 382/103
(58) Field of Classification Search ............... 348/152, 348/143, 169, 153, 699, 218.1; 382/103
See application file for complete search history.

(56) References Cited

U.S. PATENT DOCUMENTS

| 6,424,371 | B1* | 7/2002 | Wen .......................... 348/153 |
| 6,493,041 | B1* | 12/2002 | Hanko et al. ............... 348/699 |
| 7,015,954 | B1* | 3/2006 | Foote et al. ............. 348/218.1 |

* cited by examiner

*Primary Examiner*—Gims Philippe
(74) *Attorney, Agent, or Firm*—Brown & Michaels, PC

(57) ABSTRACT

A technique to automatically detect intruders in a restricted area. The technique detects the intruders position in real time from digital camera images (both visible and infrared) and presents it to an operator. The operator aids in locating, identifying and assessing the potential threat of an intruder are provided. The approach can be structured for a wide range of mission deployment ranging from a simple jungle trail, an oil refinery, to an entire airfield.

18 Claims, 3 Drawing Sheets

STROBES

ZOOM

WINDOW

AUTOMATIC INTRUSION DETECTION SYSTEM FOR PERIMETER DEFENSE

REFERENCE TO RELATED APPLICATIONS

This application claims an invention which was disclosed in Provisional Application No. 60/418,472, filed Oct. 15, 2002, entitled "Automatic Intrusion Detection system for Perimeter Defense". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of detection systems. More particularly, the invention pertains to intrusion detection systems using optical image processing techniques.

2. Description of Related Art

The War on Terror that began on Sep. 11, 2001 has drastically changed the American way of life. Terrorism is no longer something that happens to someone else in some other place. The new reality is that any American or American asset is vulnerable to terrorist attack and potential targets range from military bases to city water reservoirs. As the list of potential targets is practically endless, the American manpower and financial resources necessary to protect all these targets can become enormous. To complicate matters, immediate action is needed.

Our terrorist enemies have repeatedly used the cover of darkness for their operations and defense against night operations is extremely difficult. To deny the enemy the use of night cover will be an important step in reducing the effectiveness of his night time operations. A survey of the technology shows that a digital infrared (IR) camera is the prime sensor candidate for such a system.

There are some basic problems with current intruder detection systems that use IR and optical images. They require human operators to observe the images and make the intruder detection decision. This is a very manpower intensive operation with an attendant high overhead cost. Another problem with the manual system is that an intrusion is a rare event. Boredom and human nature will tend to degrade the system effectiveness even under the best conditions of operations discipline. An automatic detection process will provide consistent reliable system performance and reduce the manpower requirements needed to monitor the system operation to a minimum and perform the necessary situation assessments.

There are several methods of automatic motion detection using images that have been used in the past:

1. In the first implementation, the current image is compared against a stored, static, background image. This configuration provides good motion detection but is one prone to high false alarm rates when changes occur in the environment.
2. In the second implementation of comparing the two successive images, the current image is compared to the immediately prior image. Each time a new image is received, the current image replaces this prior image. While this technique works in most cases, there are some problems with this simple frame to frame technique.
   (a) An intruder that is moving very slowly may not be detected at all unless the time period between the two successive images is fairly long.
   (b) An intruder can move and then stop with the result of a single detection followed by no further detections which could be mistaken for a false alarm. By a series of quick moves followed by long halts, it is possible to penetrate an area without being detected.

In either case, any noise appearing on either the current image or the prior image, is detected as an image difference. This difference is a false alarm and since noise can appear on either the current image or the previous image, the false alarm rate is doubled in such a motion detection process.

SUMMARY OF THE INVENTION

The system described here deals with the automatic detection of intruders into a sensitive area and supports an identification/threat assessment function.

The key to the effectiveness of the system is an automatic detection process that has a high probability of detection and a low false alarm rate. Both these requirements must be satisfied in order to maintain user confidence. The detection process begins with the digital, IR or visual, image. Multiple sensor modules as shown in FIG. 1 form a presentation barrier. Digital IR and visual cameras in these sensors take the pictures at a periodic rate. Each picture frame is processed by the computers for intrusion detection. First each frame is divided into detection cells comprising of several adjacent pixel elements which are then processed to blur the image. The blurred image is next processed by producing a sliding average of cell values, which is compared to the current image cell value to get a difference, which in turn is thresholded to produce the detection decision. The digital image, processed by the techniques described herein, is the means to detect an intruder and also is the basis for intruder identification. The use of digital optical cameras along with the IR cameras will provide the security for both day and night operations.

BRIEF DESCRIPTION OF THE DRAWING

FIG. 4c shows a complete image from one of the sensors mapped in FIG. 4a

DETAILED DESCRIPTION OF THE INVENTION

Figure 1:
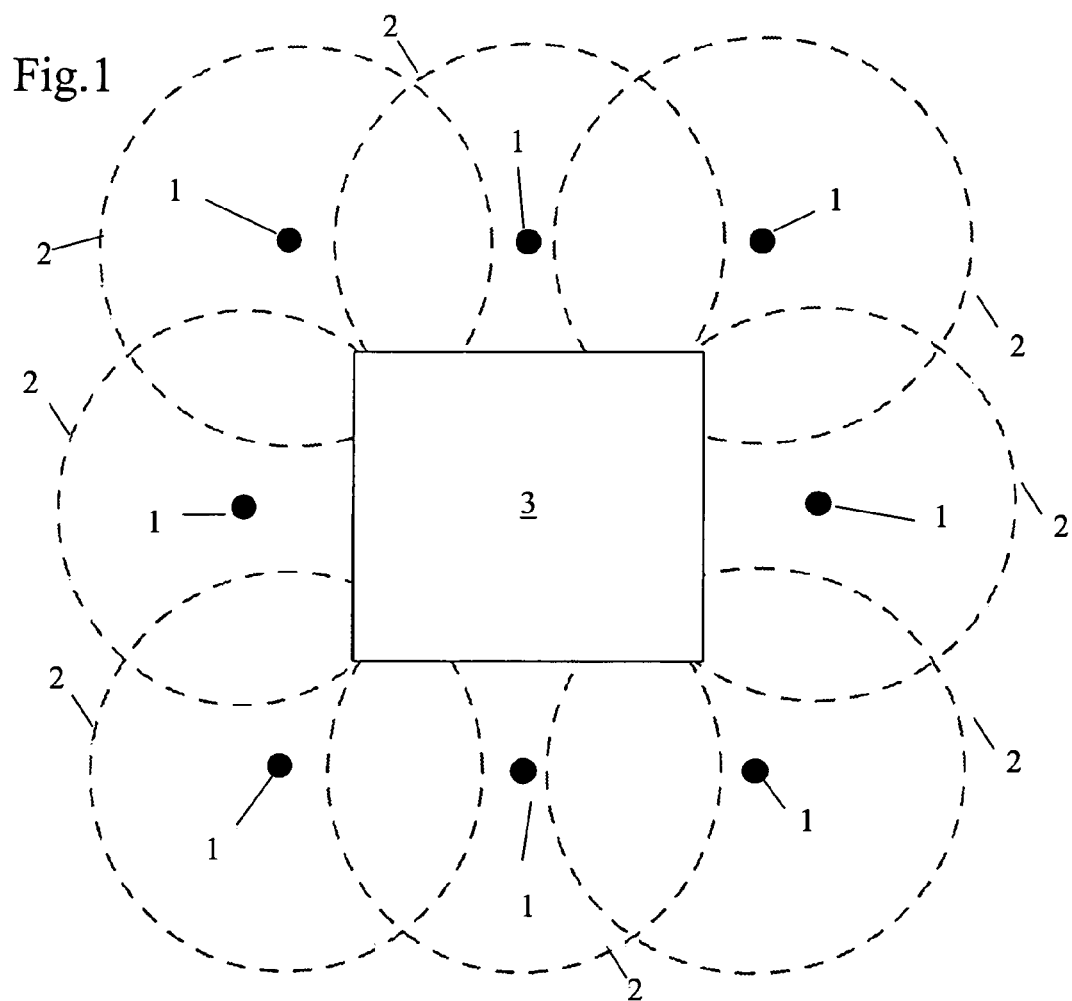
FIG. 1 shows a schematic representation of overlapping fields of view of multiple sensor modules surrounding a facility.

The detection process begins with the digital infrared (IR) or visual, image. Multiple sensor modules (1) having overlapping fields of view (2) are positioned around a facility (3)

as shown in FIG. 1, to form a presentation barrier. Digital IR and/or visual cameras in these sensors take the pictures at a periodic rate.

Figure 2:
FIG. 2 shows an image for image processing, subdivided into cells.

Each picture frame (10, FIG. 2) is processed by computers for intrusion detection. First each frame is divided into detection cells (12) comprising of several adjacent pixel elements which are then processed to blur the image. The blurred image is next processed by a motion detection algorithm which is then thresholded to produce the detection decision. A summary of these processes is presented below.

Blurring. Blurring is a technique that reduces the false alarm rate due to video spikes and small objects such as insects, birds and wind blown chaff passing through the field of view. When the image (10) is received, it is divided into rectangular detection cells (12) containing a number of adjacent pixels (See FIG. 2). Blurring is accomplished by averaging the amplitude of the pixels' intensity within the cell and reporting the average to the motion detector. This technique is equivalent to a low pass filter that suppresses spike noise due to small objects that affect only a few pixels while allowing larger objects such as the image of a man, to pass through. Blurring when matched to the dimensions of the expected images, does not adversely affect detection probability. The original un-blurred image is retained and stored for archival display.

Motion detection. Motion detection is accomplished by comparing the blurred detection cells of the current image frame against the blurred cell images of the previous image frames. A difference between the images signifies a potential detection.

We resolve these problems by performing the comparison of the current cell image with the average of several corresponding cell values of the previous frames. The sliding average (SA) is used where the value of the latest blurred cell amplitude replaces the oldest in memory. A new cell average is calculated for use in each successive comparisons. The cell average is thereby adaptive to environmental changes with a time constant equal to the time period of the number of frames used in the sliding window.

The averaging motion detector functions are described below. We can write the average of n reports, $C_N$:

$$C_n = (1/n)A_1 + (1/n)A_2 + \ldots + (1/n)A_n$$

Where $A_1, A_2 \ldots A_n$, are the blurred amplitudes of the background from the corresponding detection cell. Prior to an intruder entering the cell, $C_n$ is simply the average of the background cell amplitude over n frames and $A_1, A_2, \ldots A_n$, $C_n$ and $A_{n+1}$ are nearly equal since they originate from the same source. If an intruder enters the cell, the blurred cell amplitude is increased by an amount I and the signal amplitude, s, of the blurred cell is:

$$S = I + A_{n+1} \approx I + C_n$$

The difference output amplitude of the current blurred cell and the sliding average in the detection signal, R is:

$$R_n = S - C_n = I$$

The next output of the sliding average is then:

$$C_{n+1} = 1/n(A_2 + A_3 + \ldots + A_n + A_{n+1} + I) = C_n + (I/n)$$

If the intruder I stays in the cell, the blurred cell amplitude stays S and the amplitude of the second output of the motion detector is:

$$R_{n+1} = S - C_{n+1} = I + C_n - C_n - (I/n) = I(1 - (1/n))$$

It can be shown that a general term, $R_{n+j}$, can be written:

$$R_n + j = I(1 - j/n)$$

This expression shows that for a series of n constant amplitude inputs of amplitude I, the amplitude of the motion detector output is a monotonically declining series. The first output is of amplitude I(j=0) and the last (j=n), of amplitude zero.

As an example, the step response of the averaging motion detector, corresponding to an intruder staying in a cell for 14 frames, is shown in FIGS. 3a through 3d.

Before the intruder enters (30), the cell is blank (40) and the blurred cell amplitude signal or "cell value" (36) is at a constant. At time (31) the intruder enters the cell (41), and there is a step increase in the cell value (36). During the frames between times (31) and (33), as the intruder enters (41), runs through (42) and leaves (43) the cell, the cell value remains constant. Finally, after the intruder leaves (34), the cell is once again blank (44), and the cell value is again at the same constant as before (30). It will be understood that this constant may be defined as "zero", or "empty cell", although the actual cell value might be a non-zero absolute number if the cell was not really "empty", but had a stationary object—say, if there was a tree in the cell which did not move from frame to frame.

Figure 3A:
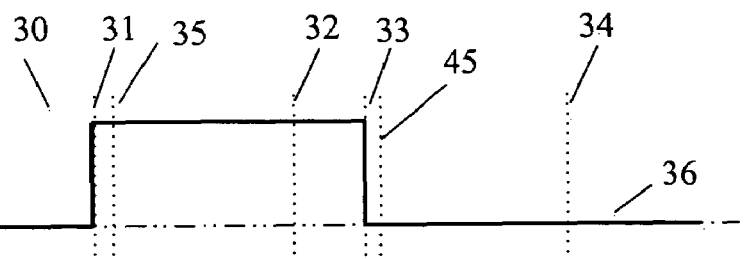
FIG. 3a shows a waveform of cell value from a single cell image over a number of frames.
Figure 3B:
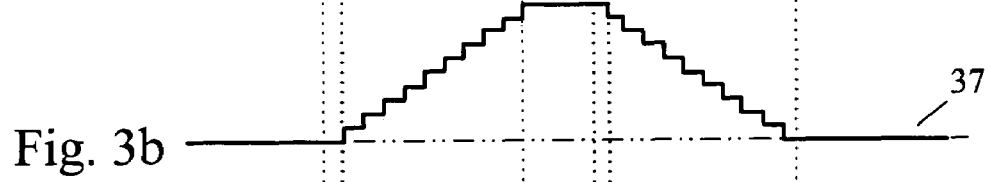
FIG. 3b shows a sliding average of the cell values over the same frames as FIG. 3a FIG. 3c shows a graph of differences of the sliding average of cell values of FIG. 3b

FIG. 3b shows a ten frame interval sliding average (37) based on the cell value of FIG. 3a. The sliding average (37) starts at a constant ("zero") before (30) the intruder enters the frame. The intruder enters at (31) and one frame later (35) the sliding average increases in a stepwise linear manner until the output saturates at (32). The intruder leaves at (33), and one frame later (45) the average starts decrementing to the original value.

Figure 3C:
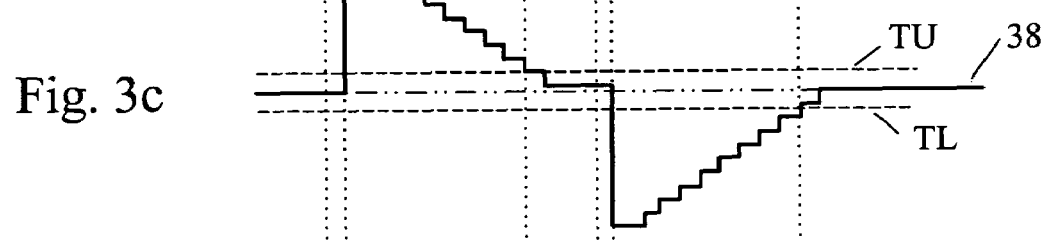
FIG. 3d shows five frames corresponding to some of the frames in FIGS. 3a-3c
Figure 3D:
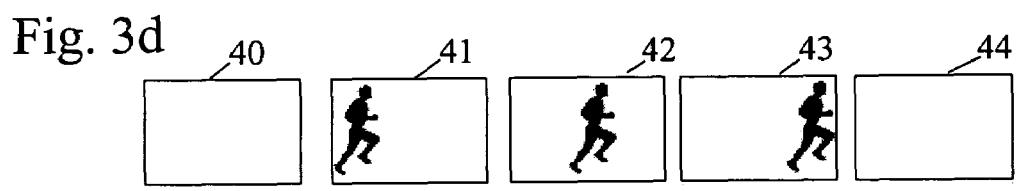
Figure 4A:
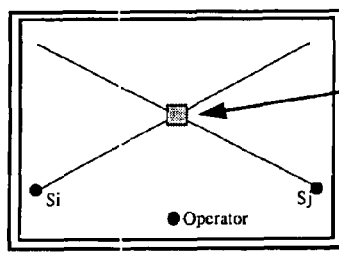
FIG. 4a shows an operator display for use with the invention, with strobe lines displayed.
Figure 4B:
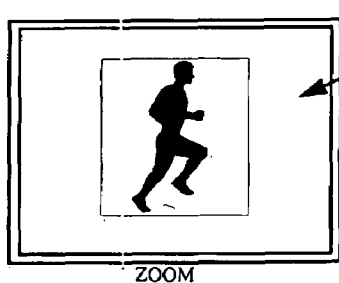
FIG. 4b shows a zoomed cell image from FIG. 4c
Figure 4C:
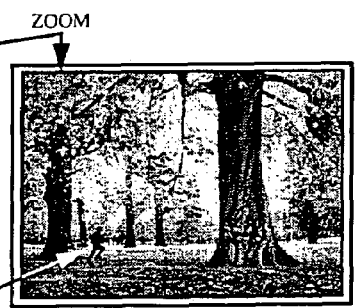
Figure 4D:
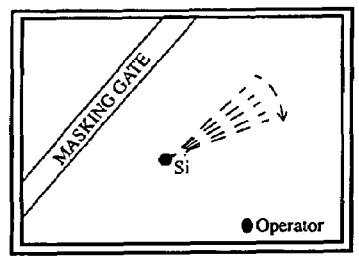
FIG. 4d shows an alternative display to FIG. 4a, with moving strobe lines and masking gate.

FIG. 3c shows the difference (38) between the cell value (36) and the sliding average (38). It is the properties of this difference that is exploited in later processing.

Detection thresholds. As shown in FIG. 3c, two amplitude detection thresholds operating on the motion detector cell differences provide the intruder detection decisions. If the difference amplitude (38) exceeds an upper threshold (TU) or below a lower threshold (TL), a detection is reported.

When an intruder moves into a cell (31) (and possibly stops), the current frame/SA difference (38) continues to produce an output thus ensuring a detection. An intruder that enters a detection cell and remains in the cell will produce a motion detector outputs over n frames. For the condition where the intruder remains in the cell for longer than n inputs, the sequential threshold (described later) maintains a record of the intruder presence in the cell. It must be noted that the "successive frame difference" method will provide only one detection, which could be mistaken for a false alarm. Thus, the technique presented here resolves the problems of the "successive frame difference" technique with slowly moving and move/stop intruders.

When the intruder moves out of the cell (33), the difference (38) abruptly reverses its polarity. This polarity reversal accomplishes two things. First, the detection is confirmed. A sequence of detection in one polarity followed by a polarity reversed detection sequence, is a very strong indication that a detection rather than a noise alarm has occurred. Second, it allows us to estimate the time that the intruder remained in the cell. This time, together with the history of previous detections, may be significant in estimating the intent of the intruder.

The effects of spike noise that can produce a false detection, are suppressed because the averaging process reduces the noise amplitude that might appear on the reference image. The averaging technique has the additional benefit of making the detection process self adaptive to environmental background level changes.

Also, the use of two thresholds provides detection for both the case of a bright object against a dark background or dark object that obscures a bright background.

Thus, the dual threshold together with the sliding average difference enhances the detection of moving intruders.

Sequential Detection. The amplitude thresholds are followed by a sequential threshold. When a threshold detection occurs in a cell, a count begins of the number of these detections. When this count exceeds a threshold (TC), the detection is confirmed and cell active condition is set that remains in effect until in amplitude threshold reversal is detected. The count continues to increment in order to estimate the time that the intruder remains in the cell.

For rapidly moving intruders, a different approach is used. If TC is not satisfied when a detection occurs and no further detections are received in the cell, a search of adjacent cells is initiated to determine if a detection has occurred. A nearby cell detection will confirm a likely penetration and provide angular speed estimates to predict the next likely detection cell.

Intrusion Alerts. An intruder detection by a sensor is transmitted to the central computer where an operator alert is generated. The decision to raise an intrusion alarm can be based on more complex rule based algorithms utilizing the detections generated by thresholds and sequential counters on all the cells of the image. For example, looking at adjacent cell detection for fast moving target is already mentioned above.

We might also look for confirmation of the detection by other sensors if a detection lies in the overlapping coverage of other sensors. The simultaneous detections by other sensors will further confirm the intrusion. When an intruder is detected by two sensors in overlapping coverage, the point at which the strobe lines cross indicates the intruder position. A central computer can then easily calculate the actual intruder position.

Masking gates that inhibit detections in operator designated areas, are a necessary function. These gates inhibit the reporting of detections due to known causes. For example, a road with heavy traffic where engines emit considerable IR radiation, can be inhibited to avoid constant alerts that would interfere with operations.

Operator Displays. Preferably, a very flexible human-machine interface is provided. FIG. 4 illustrates some of the representative displays available to the operator. The main features of the interface are summarized below:

(a) A display map of the sensor configuration is provided and when a detection occurs, a strobe line from the sensor position to the detection is generated. The strobe line will show the bearing of the detection with respect to the sensor and provide direction for a response to the intrusion. If the position of the intruder is available (e.g., by virtue of its being detected by two sensors), a strobe line would be generated that shows the intruder's position with respect to the operator.

(b) It can also show, upon demand, raw images from these sensors on a multiple-window screen. These images can be further enhanced for contrast using well known digital enhancement techniques such as, the Histogram Equalization and Histogram Projection developed by Rome Laboratories. When an intrusion detection occurs, a window is positioned on the sensor image that shows the location of the intruder. The ability to "zoom" the center of the window aids the operator in identification and threat assessment processes.

(c) A time history of detections will aid the operator in performing threat assessment. When an alarm is generated, it is stored in computer memory. An operator request will display these alarms in the time sequence that they were-generated creating a rapidly moving display of strobes that will show the direction of intruder movement.

(d) The system will also display the other relevant information such as the estimate of the intruder's speed and the direction in which the intruder is moving.

(e) A record of any detections and operator actions, is stored to allow post op analysis of any event that occurs. The record will also be useful for training. Either tape or CD media are suitable choices for these recordings.

Visual image processing. Automatic detection using conventional digital cameras in the visual spectrum appears to face certain problems that are not so pronounced in IR images. The visual environment appears to be less stable than the IR. With IR, the energy is emitted by objects in the field of view and this energy changes slowly over time. In the visual region of the spectrum, the energy from an external source is reflected by the objects in the field of view. This energy can be affected by events that can cause rapid changes. For example:

1. Clouds moving across the sun can cause rapid changes in the illumination level.
2. The sun appears to move across the sky in an arc that causes changes in illumination and reflection from objects in the field of view.
3. Wind can cause movement of objects (trees, sign posts, coke cans, etc.) that in turn can cause rapid changes in reflected light.

The effect of these problems is to cause uniform changes in the whole image (and not just one of the blurred cell average). The cloud cover and effects of movement of the sun will very likely affect a larger area and may affect the entire image frame. Therefore any changes in the image due to these effects could be compensated by a scale factor that is proportional to an average of the whole image. This compensated image can then be processed for intruder detection by the techniques described herein. We believe that using a higher scan rate (i.e., images per second) will alleviate some of the wind generated false alarm problems.

System implementation. There are several possible implementations for the intrusion detection system described here in. The angular coverage is divided into azimuth sectors corresponding to the camera field of view and periodic image (snapshots or frames) is taken for each azimuth sector.

The field of view for commercial cameras is typically between 20 to 30 degrees and in most applications, a greater azimuthal coverage is required. We consider two methods to achieve this coverage. First, a straight forward solution is to employ multiple cameras configured to provide contiguous angular coverage. While this approach may seem to be complicated at first glance (i.e., 18 cameras with a 20 degree field of view will be required for 360 degree coverage) it is becoming very practical. The cost of cameras is decreasing (under $1,000.00), while the size and weight have decreased to a few cubic inches and a few ounces. Power requirements are typically less than one watt. At the same time, resolution (number of pixels) has increased by nearly an order of magnitude in the last two years. Pressure from private, commercial and military users will encourage these trends to continue. This is the preferred configuration for most deployments.

The second solution is to rotate one or more cameras in the horizontal plane in the manner of a radar antenna. As the camera rotates, a single image is reported at angles corresponding to the field of view. A rotation period of 2 to 3 seconds is practical mechanically without major balancing problems. This configuration is best suited to tactical applications where minimum size, weight and power are primary concerns.

The camera(s) (IR and/or visual), the necessary communication linked to the control computer, the embedded microprocessor controller and power source mounted on an appropriate pedestal make up a basic sensor module. The separation between sensors in deployment is chosen to provide a great deal of coverage overlap between adjacent sensors in order to maximize the probability of detection.

The image processing as described here in could be done by an embedded computer at each sensor. It is also possible to perform this frame to frame image processing by the central computer. The communication links between the sensors and the central computer are off the shelf cable or wireless with the media selected to suit the deployment. For fixed site installations, fiber optic cable is likely to be the media of choice whereas a tactical deployment may demand wireless links.

Accordingly, it is to be understood that the embodiments of the invention herein described are merely illustrative of the application of the principles of the invention. Reference herein to details of the illustrated embodiments is not intended to limit the scope of the claims of the patent which will be based upon this provisional application, which themselves will recite those features regarded as essential to the invention.

What is claimed is:

1. A method of detecting intrusion in an area by analysis of a plurality of time-sequential image frames from at least one image sensor, comprising the steps of:
   a) taking a current image frame;
   b) dividing the current image frame into a plurality of cell images, each cell image being a portion of the current image comprising a plurality of adjacent pixels;
   c) blurring the cell image;
   d) storing a value representing the blurred cell image in a stack of a plurality of time-sequential cell values, incrementing the stack such that an oldest cell value is lost when the value is added to the stack;
   e) computing a sliding average of the plurality of cell values in the stack;
   f) computing a difference between the cell value from the current image and the sliding average;
   g) reporting a detection if the difference exceeds a defined lower threshold or a defined upper threshold;
   g1) starting a count when a detection is first reported in step (g);
   g2) incrementing the count each time another image is processed and the detection remains reported;
   g3) confirming the detection and setting a cell active condition when the count exceeds a count threshold; and
   h) repeating the method from step (a);
   wherein steps (g1), (g2), and (g3) are sequential after step (g).

2. The method of claim 1 in which the images are taken using infrared.

3. The method of claim 1 in which the images are taken using visual light.

4. The method of claim 1 in which the blurring step comprises averaging an intensity amplitude of the pixels in the cell image.

5. The method of claim 1, further comprising the step of resetting the cell active condition and stopping the count when an opposite threshold is reached from the threshold which caused the detection to be reported.

6. The method of claim 5 further comprising the step of estimating the time an intruder remains in a cell from the count.

7. The method of claim 1, further comprising the step, if a detection is reported in step (g), but after a selected time the count threshold is not exceeded, of searching adjacent cells to determine if a detection has occurred, and confirming a detection if a detection has occurred in an adjacent cell.

8. The method of claim 7, further comprising the steps of deriving an angular speed and direction estimate from the relative direction of the adjacent cell, and predicting the next likely detection cell.

9. The method of claim 1, further comprising the step of reporting the detection to a central computer.

10. The method of claim 9, further comprising the step of the central computer raising an intrusion alarm based on selected rules and the reported detections from a plurality of image sensors.

11. The method of claim 10, in which the central computer confirms a detection by detections from other image sensors having overlapping coverage.

12. The method of claim 11, further comprising the step of deriving an intruder position from image data from at least two sensors having overlapping coverage.

13. The method of claim 9, further comprising the step of the central computer displaying a map of the plurality of sensors, and when a detection occurs, putting an indication on the map.

14. The method of claim 13, in which the indication is a strobe line indicating a bearing of detection from the sensor at which the detection occurred.

15. The method of claim 1, in which selected cells are masked off and not processed, such that reporting of detections due to known causes is inhibited.

16. The method of claim 1, further comprising the step of storing a plurality of images for historical comparisons.

17. The method of claim 16, further comprising the step of displaying a the plurality of images in time sequence upon detection of an intrusion, such that intruder movement is shown.

18. The method of claim 1, further comprising the step of storing a record of detections.

* * * * *